UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, OF LONG ISLAND CITY, NEW YORK, A CORPORATION OF NEW JERSEY.

MANGANOUS MANGANATE AND PERMANGANATE DEPOLARIZING AGENT.

1,232,904.  Specification of Letters Patent.  Patented July 10, 1917.

No Drawing.  Application filed October 25, 1915. Serial No. 57,644.

*To all whom it may concern:*

Be it known that I, CARLETON ELLIS, a citizen of the United States, and a resident of Montclair, in the county of Essex and State of New Jersey, have invented certain new and useful Improvements in Manganous Manganate and Permanganate Depolarizing Agents, of which the following is a specification.

This invention relates to manganese depolarizing material adapted for batteries of the Leclanché type and relates in particular to the manganese salts of manganic and permanganic acid, including the normal, basic and acid types and to a desirable physical form thereof.

For example by reacting on a manganate with a manganous salt and according to the proportions used, basic, acid and normal manganous manganates are formed, the normal manganous manganate having the composition $MnO \cdot MnO_3$, the basic manganous manganate being represented by $(MnO)_2 \cdot MnO_3$ and the acid manganous manganate having the formula $MnO \cdot (MnO_3)_2$, or $MnO \cdot H_2O \cdot (MnO_3)_2$, or $H_2Mn(MnO_4)_2$. Similarly manganous permanganate in its several forms may be used such as the normal manganous permanganate $(MnO)_2 \cdot Mn_2O_7$, the basic manganous permanganate $(MnO)_3 \cdot Mn_2O_7$ and the acid permanganate $MnO \cdot H_2O \cdot Mn_2O_7$ or $H_2Mn(Mn_2O_8)$. Other bases may replace the manganous manganese in whole or in part.

These compounds lose their oxygen very readily when heated to a comparatively low temperature and are far more active than a depolarizer such as ground pyrolusite which does not give up its oxygen very freely. Such bodies in the finely-divided state either separately or in admixture may be incorporated with graphite to form a depolarizing mass which may be molded under pressure to any desired shape for use in dry batteries with an ammonium chlorid exciting fluid prepared in the usual way employing carbon and zinc electrodes.

Much effort has been made to secure a very highly active form of manganese dioxid of suitable character and the present composition affords depolarizing material of very high activity.

By way of illustration it may be noted that barium permanganate may be prepared by fusing together barium hydroxid, potassium nitrate and potassium permanganate. The materials should be thoroughly mixed and heated to a temperature of about 280° C.

The proportions used are 2 parts potassium permanganate, 5 parts potassium nitrate and 12 parts barium hydroxid. The product is then washed thoroughly.

By digesting this compound with a solution of manganous chlorid for several days the barium chlorid is replaced by the manganese of the manganous chlorid and barium chlorid is formed, leaving an insoluble manganous permanganate.

By substituting potassium manganate for potassium permanganate the barium manganate will be formed and from this insoluble manganous manganate can be formed by digesting with manganous chlorid.

Acid, normal, or basic compounds may be formed by varying the proportion of reagent and those given above will give the normal compound.

Aside from having the necessary component of oxygen, the physical form of the depolarizing material is an important consideration. In the present case, flaky products may be obtained which when employed with flaky graphite enable the formation of a lamellar depolarizing mass through which a very satisfactory penetration of the electrolyte is secured and the conductivity of such a laminated mass is relatively high. The flaky material may be formed by passing the above product in a wet state through heated heavy rolls, whereby the material is dried and left in a flaky condition.

What I claim is:—

1. A manganous compound of a highly oxygenated acid of manganese adapted for use as a depolarizing agent in dry batteries.

2. A manganous compound of a highly oxygenated acid of manganese of a flaky character, adapted for use as a depolarizing agent in dry batteries.

3. A manganous compound of a highly oxygenated acid of manganese comprising manganous manganate adapted for use as a depolarizing agent in dry batteries.

4. A manganous compound of a highly oxygenated acid of manganese adapted as a depolarizing agent for dry batteries.

5. As a depolarizing agent manganous manganate.

6. As a depolarizing agent neutral manganous manganate.

7. As a depolarizing agent an insoluble manganate.

8. As a depolarizing agent an insoluble manganate of flaky nature.

CARLETON ELLIS.